April 4, 1961 W. L. MATTHEESSEN ET AL 2,977,805
HYDRAULIC DECELERATOR FOR A SPRING BALANCED ENGINE GOVERNOR
Filed July 27, 1959
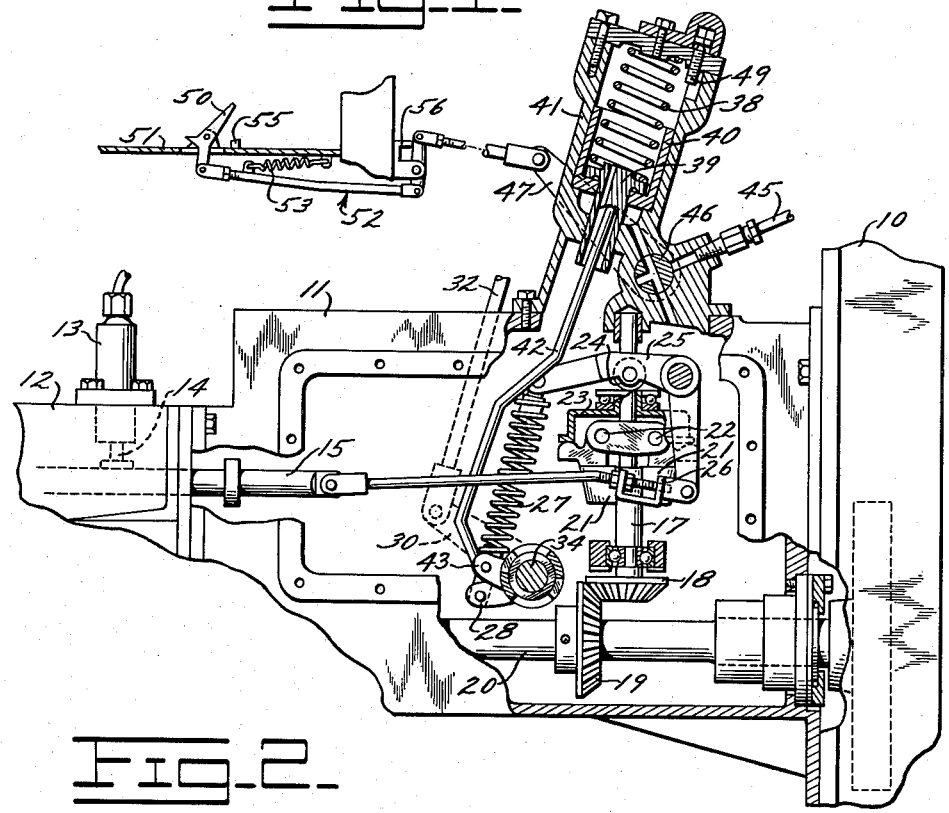
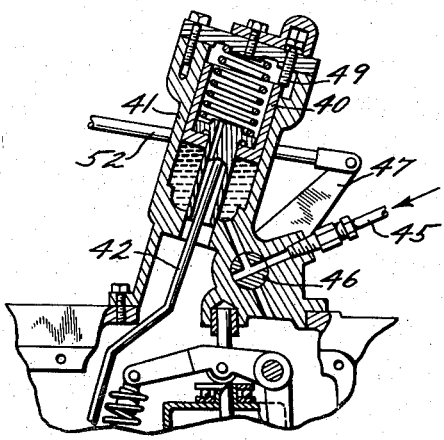
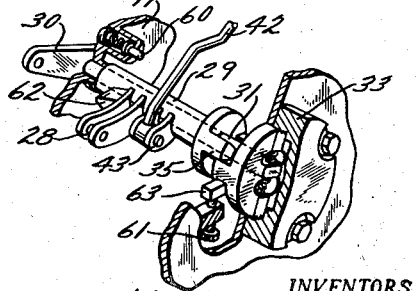
INVENTORS
WILLIAM L. MATTHEESSEN
BILLY H. WORKMAN
BY
ATTORNEYS United States Patent Office 2,977,805
Patented Apr. 4, 1961

2,977,805
HYDRAULIC DECELERATOR FOR A SPRING BALANCED ENGINE GOVERNOR

William L. Mattheessen and Billy H. Workman, Pekin, Ill., assignors to Caterpillar Tractor Co., Peoria, Ill., a corporation of California Filed July 27, 1959, Ser. No. 829,627

1 Claim. (Cl. 73—523)

The present invention relates generally to an auxiliary control for an internal combustion engine, the speed of which is governed by a mechanical spring balanced governor and particularly to a decelerating device which is pedal actuated for effecting temporary deceleration of an engine through the application of hydraulic pressure for adjusting the governor spring without disturbing the normal manually controlled setting of the governor.

In many tractors as well as other types of road grading and earthmoving vehicles, there are several hand actuated levers under the operator's control. The operation of the engine which drives a vehicle is customarily controlled by a hand throttle capable of being set for any desired engine speed. Frequently the hand throttle is set at full load position and due to a change in operating conditions the load which the vehicle is handling is reduced calling for an adjustment of the throttle. This may occur while the operator is negotiating a turn or while the vehicle is passing over the crest of a hill or under various other circumstances requiring adjustments which occupy both hands of the operator and render it impractical for him to adjust the throttle.

It is desirable, therefore, that the operator of such a vehicle be able momentarily to decelerate an engine operating in a high load range and then permit its immediate reacceleration back to the range at which it had been operating. Various mechanical devices have been provided for this purpose but the high tension springs employed for governors of large engines make the operation of such decelerating device difficult and inconvenient. It is, therefore, an object of the present invention to provide in combination with a vehicle having an engine and a manually actuated throttle therefor an auxiliary pedal actuated hydraulically powered control means capable of momentarily decelerating the engine and further to provide such means which, upon release of pedal pressure, will permit immediate return of the engine to its former operating condition dictated by the setting of the manual control means.

Further objects and advantages of the invention are made apparent in the following specification wherein reference is made to the accompanying drawings.

The drawings illustrate the invention and it is described herein as applied to the fuel control system of a compression ignition engine but it will become apparent from the following specification that the control means therein described is applicable to various other types of engines.

In the drawings:

Fig. 1 is a fragmentary view in side elevation and with portions broken away and shown in section of a governor and control means for a compression ignition engine showing the application thereto of a pedal actuated hydraulically powered decelerator constructed in accordance with the present invention;

Fig. 2 is a fragmentary view of a portion of the mechanism illustrated in Fig. 1 showing the parts thereof in a different operating position; and Fig. 3 is a fragmentary perspective view of another portion of the mechanism illustrated in Fig. 1.

In Fig. 1 of the drawings, a portion of an engine is illustrated at 10 as having a governor housing 11 secured thereto and a fuel pump housing 12 secured in turn to the governor housing. The fuel pump housing contains a number of fuel pumps corresponding to the number of cylinders in the engine, one of such pumps being illustrated at 13. The pumps are of a conventional type with angularly adjustable plungers 14 with segment gears secured thereto and engaged by a rack 15 so that sliding movement of the rack effects angular adjustment of the plungers and the volume of fuel delivered to the engine cylinders for each plunger stroke. These plungers are conventionally reciprocated by means of a cam shaft not shown.

The governor within the housing 11 is also generally of conventional design having a rotatable spindle 17 driven by bevel gears 18 and 19 from an engine driven shaft 20 so that the spindle operates at a speed proportionate to the speed of the engine. The spindle carries a pair of governor flyweights 21 pivoted as at 22 to swing outwardly in response to speed of the spindle and to bear upwardly on a thrust element 23 against an antifriction roller 24 on a bellcrank lever 25. One end of the lever 25 is connected with the rack bar 15 through an adjustable link 26 and the other end is connected with a governor spring 27 at its upper end as shown. The lower end of the governor spring is connected between arms 28, see also Fig. 3, on a compound lever 29, a lever arm 30 is disposed exteriorly of the housing 11 and is fixed to a shaft 31 upon which the compound lever 29 is rotatably supported. The lever arm 30 is connected as by linkage, a part of which is shown at 32 with a governor control lever, not shown, disposed as usual at an operator's station. Through manipulation of the lever 30 through the governor control lever, the operator can apply tension to the governor spring 27 for high speed operation or relax the tension on the spring for low speed operation. The governor control lever and the tension on the spring are held at any desired setting by a ratchet mechanism of any suitable type in the present instance indicated as a rotatable ratchet device shown at 33 in Fig. 3, the rotatable part of which is carried by the shaft 31 upon which the compound lever 29 is rotatable and the compound lever is connected with the ratchet mechanism as by lugs 35 carried by the lever and disposed within recesses in the ratchet mechanism to provide a lost motion connection enabling the compound lever to be swung toward a shutdown position without disturbing the pre-set position of the governor control lever and associated mechanism.

An expansible spring 38 of greater strength than the governor spring 27 normally prevents contraction of the governor spring from the position at which it has been set by bearing upon a spring seat 39 reciprocably mounted in a piston 40 which is in turn reciprocable in a cylinder 41. The spring seat 39 bears upon one end of a rod 42, the other end of which is connected between lever arms 43, see also Fig. 3, formed as a part of the compound lever 29. Thus the spring 38 and the means connecting it to the compound lever 39 provide a resilient anchor for one end of the governor spring 27. With the construction described, the engine may be decelerated without disturbing the position of the fuel control mechanism or the original setting of the tension on the spring 27 by compressing the spring 38 and thereby permitting the governor spring 27 to swing the compound lever 29 in a clockwise direction reducing its own tension and temporarily adjusting the governor for low idle operation of the engine.

Temporary deceleration is accomplished by admitting oil under pressure to the cylinder 41 below the piston 40 therein in order to raise the spring seat 39 which holds the governor spring under tension through the rod 42. To this end, a supply of fluid under pressure such for example as may be derived from the lubricating oil system of the engine is connected with the governor as by a line 45, communication of which with the cylinder 41 is controlled by a rotary type three-way valve 46. The valve is adapted to be rotated by a lever 47 from its closed position shown in Fig. 1, which provides a drain for the cylinder 41, to its open position shown in Fig. 2 which closes the drain and directs fluid under pressure from the line 45 into the cylinder. Upward movement of the piston 40 is limited as shown in Fig. 2 by an adjustable set screw 49 to a position where the governor is set for low idle operation of the engine. Manual shutdown of the governor which requires relaxing of the spring beyond this point may be accomplished because the spring seat 39 is reciprocable within the cylinder 40 and is free to move upwardly to further compress the spring 38 without interference with the low idle stop 49.

The valve 46 is controlled by a pedal 50 disposed preferably on the floor board of the operator's station which is shown at 51 and the pedal is connected with the lever 47 by suitable linkage generally illustrated at 52. A spring 53 returns the valve 46 to its closed position when pressure is removed from the pedal 50 and stop members may be provided to limit the movement of the valve to its fully opened and fully closed positions. Such stop members are illustrated for example as a lug 55 limiting depression of the pedal 50 and a second lug 56 which limits return movement under influence of the spring 53. A low idle stop 60 and a high idle stop 61 engageable with abutments 62 and 63, respectively, are provided for the governor as shown in Fig. 3. The low idle stop is resilient so that it can be overridden to shut the engine down.

Temporary deceleration of the engine to a speed greater than low idle may be accomplished by depression of the pedal 50 less than the full distance allowed to accomplish cracking or partial opening of the valve 46.

We claim:

In an engine governor of the kind which includes a spring for balancing the centrifugal force of flyweights, a manually adjustable anchor for one end of the spring to vary its tension, a cylinder, a piston reciprocable in the cylinder, a spring seat in the piston, a spring stiffer than the governor spring disposed between said seat and an end of the cylinder, means connecting said seat with the said end of the spring, and pedal actuated means to direct fluid under pressure into the cylinder to compress the stiffer spring and thereby relax the tension on the governor spring, and a stop limiting the movement of the piston in the cylinder to establish a low idle governor setting, said spring seat being slidably mounted in the piston to permit manual adjustment beyond low idle setting to shut down the engine.

References Cited in the file of this patent

UNITED STATES PATENTS 1,561,773    Carpenter    Nov. 17, 1925

FOREIGN PATENTS 740,210    Germany    Nov. 17, 1944